United States Patent
Francois

(10) Patent No.: US 11,950,534 B1
(45) Date of Patent: Apr. 9, 2024

(54) SOLAR POWERED ROBOTIC LAWNMOWER

(71) Applicant: Louna Francois, Jacksonville, FL (US)

(72) Inventor: Louna Francois, Jacksonville, FL (US)

( * ) Notice: Subject to any disclaimer, the term of this patent is extended or adjusted under 35 U.S.C. 154(b) by 783 days.

(21) Appl. No.: 17/093,788

(22) Filed: Nov. 10, 2020

(51) Int. Cl.
| | |
|---|---|
| *A01D 69/02* | (2006.01) |
| *A01D 34/00* | (2006.01) |
| *A01D 34/82* | (2006.01) |
| *A01D 43/14* | (2006.01) |
| *A01D 101/00* | (2006.01) |

(52) U.S. Cl.
CPC ........... *A01D 69/02* (2013.01); *A01D 34/008* (2013.01); *A01D 34/826* (2013.01); *A01D 43/14* (2013.01); *A01D 2101/00* (2013.01)

(58) Field of Classification Search
CPC ...... A01D 34/00–34/905; A01D 43/14; A01D 2101/00
See application file for complete search history.

(56) References Cited

U.S. PATENT DOCUMENTS

| | | | | |
|---|---|---|---|---|
| 3,421,302 | A * | 1/1969 | Dahl | A01D 43/063 55/369 |
| 4,354,339 | A * | 10/1982 | Nokes | A01D 34/008 200/46 |
| 4,987,729 | A * | 1/1991 | Paytas | A01D 69/02 320/101 |
| 4,989,400 | A * | 2/1991 | Wark | A01D 43/063 383/42 |
| 5,323,593 | A * | 6/1994 | Cline | A01D 34/008 56/11.9 |
| 8,374,721 | B2 * | 2/2013 | Halloran | A47L 9/2894 342/450 |
| 9,655,356 | B1 * | 5/2017 | Lytle, Jr. | G06F 18/22 |
| 10,136,576 | B2 | 11/2018 | Reigo | |
| 2003/0023356 | A1 * | 1/2003 | Keable | G05D 1/027 701/532 |
| 2004/0135373 | A1 * | 7/2004 | Osborne | A01D 69/02 290/1 A |
| 2007/0294991 | A1 * | 12/2007 | Medina | A01D 43/16 56/11.9 |

(Continued)

FOREIGN PATENT DOCUMENTS

| | | | |
|---|---|---|---|
| CN | 110140505 A | * | 8/2019 |
| DE | 102019121490 A1 | * | 2/2021 |

(Continued)

*Primary Examiner* — Adam J Behrens
*Assistant Examiner* — Madeline I Runco
(74) *Attorney, Agent, or Firm* — Sanchelima & Associates, P.A.; Christian Sanchelima; Jesus Sanchelima

(57) ABSTRACT

A solar powered robotic lawnmower includes a sound suppression means and a seed spreading means. The lawnmower includes a Bluetooth speaker on the device to serve as a sound suppression means. A user may play their desired audio media through the Bluetooth speaker in order to drown out the sound produced when mowing the grass. Additionally, the lawnmower includes a chute to serve as a seed spreading means. In one embodiment, the chute is located at the side of the device and serves to disperse seeds as the device mows a user's lawn. The lawnmower further features blades on a bottom end of the device to facilitate the cutting of a lawn as the device travels. A remote control is also included to allow a user to remotely control the device.

7 Claims, 2 Drawing Sheets

(56) References Cited

U.S. PATENT DOCUMENTS

Figure 1:
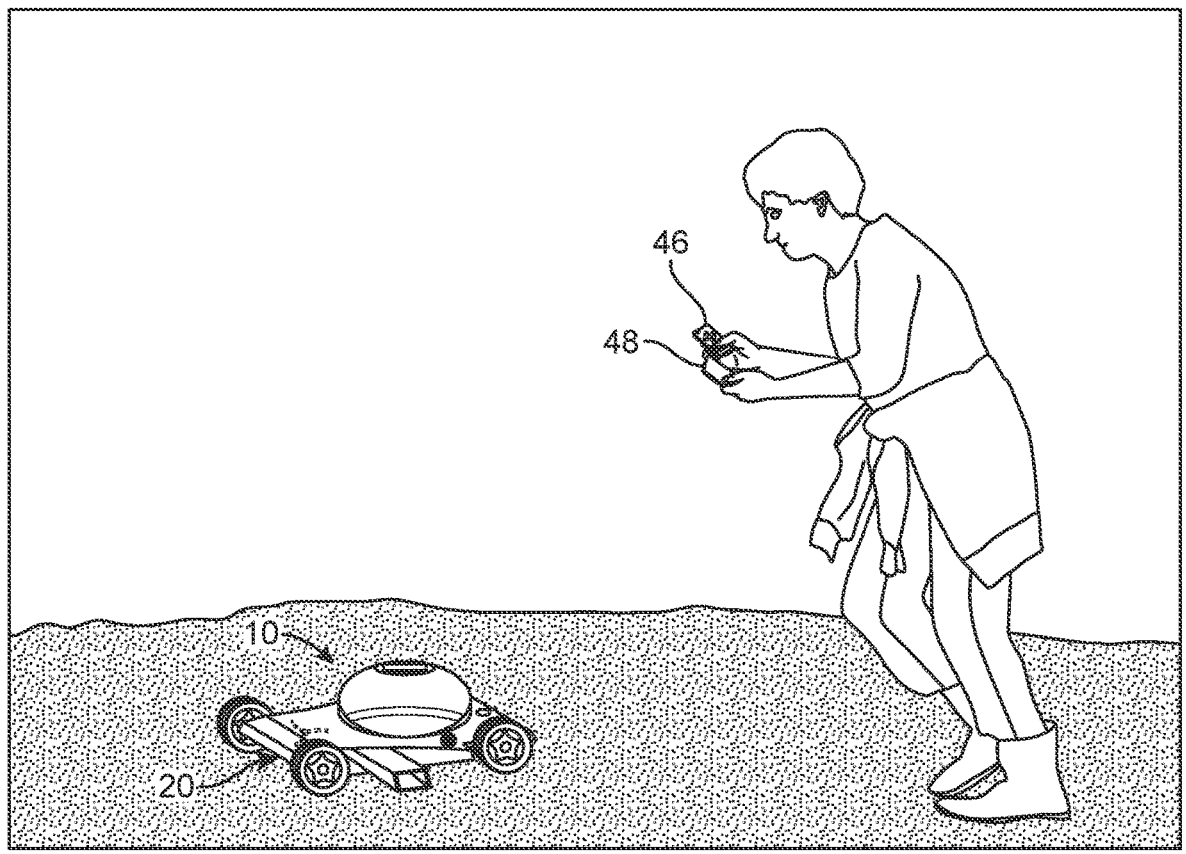

| | | | | |
|---|---|---|---|---|
| 2008/0105445 | A1* | 5/2008 | Dayton | A01C 15/02 |
| | | | | 56/289 |
| 2015/0027096 | A1* | 1/2015 | Black | A01D 45/00 |
| | | | | 56/10.1 |
| 2016/0014959 | A1* | 1/2016 | Atsumi | A01D 34/86 |
| | | | | 56/6 |
| 2019/0278269 | A1* | 9/2019 | He | A01G 25/09 |
| 2020/0037499 | A1 | 1/2020 | Al-Otaibi | |
| 2020/0041601 | A1* | 2/2020 | Ko | B25J 5/007 |
| 2020/0080266 | A1* | 3/2020 | Johnson | G01C 7/04 |
| 2020/0100425 | A1* | 4/2020 | Li | A01D 34/78 |
| 2021/0096574 | A1* | 4/2021 | Lee | B60L 53/16 |
| 2021/0185911 | A1* | 6/2021 | Agerhall | A01D 34/78 |
| 2021/0302995 | A1* | 9/2021 | Hashizume | G05D 1/0268 |
| 2021/0360853 | A1* | 11/2021 | Herrera | A01D 34/74 |
| 2021/0378172 | A1* | 12/2021 | Ackerman | G05D 1/0278 |

FOREIGN PATENT DOCUMENTS

| | | | | | |
|---|---|---|---|---|---|
| EP | 1512319 | A2 | * | 3/2005 | A01D 34/695 |
| GB | 2445347 | A | * | 7/2008 | A01D 43/063 |

* cited by examiner

SOLAR POWERED ROBOTIC LAWNMOWER

II. BACKGROUND OF THE INVENTION

1. Field of the Invention

The present invention relates to a robotic lawnmower and, more particularly, to a robotic lawnmower that includes a Bluetooth speaker as a sound suppression means and a chute to serve as a seed spreading means.

2. Description of the Related Art

Several designs for a robotic lawnmower have been designed in the past. None of them, however, include a solar powered robotic lawnmower which includes a sound suppression means and a seed spreading means. The lawnmower includes a Bluetooth speaker on the device to serve as a sound suppression means. A user may play their desired audio media through the Bluetooth speaker in order to drown out the sound produced when mowing the grass. Additionally, the lawnmower includes a chute to serve as a seed spreading means. In one embodiment, the chute is located at the side of the device and serves to disperse seeds as the device mows a user's lawn. The lawnmower further features blades on a bottom end of the device to facilitate the cutting of a lawn as the device travels. A remote control is also included to allow a user to remotely control the device. It is known that individuals often have the need to maintain a healthy and cut lawn. However, some people may not have the time nor the strength to constantly find themselves mowing a lawn. Therefore, there is a need for a robotic powered lawnmower to aid a user in automatically mowing a lawn. Additionally, the lawnmower will disperse seeds which will maintain healthy plant life along an individual's lawn. The sound suppression speaker will maintain an enjoyable environment for an individual while the lawn is being mowed.

Applicant believes that a related reference corresponds to U.S. Pat. No. 10,136,576 issued for a robotic work tool system which includes a mower a vacuum and a blower. Additionally, applicant believes that a related reference corresponds to U.S. patent publication number 2020/0037499 issued for a lawnmower robot system. However, the cited references differ from the present invention because they fail to disclose a solar powered robotic lawnmower having a sound suppression means and a seed spreading means.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a solar powered robotic lawnmower which provides a sound suppression means to provide a comfortable lawn environment for a user when mowing a lawn.

It is another object of this invention to provide a solar power robotic lawnmower which reduces the amount of work needed by a user to mow a lawn while providing a user with flexible controls when the lawnmower is mowing a lawn.

It is still another object of the present invention to provide a solar power robotic lawnmower which provides a seed spreading means to aid a user in maintaining a healthy lawn with little physical effort needed by the user.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a perspective operational view of solar power robotic lawnmower 10 in use and mowing a lawn area in accordance to an embodiment of the present invention.

Figure 2:
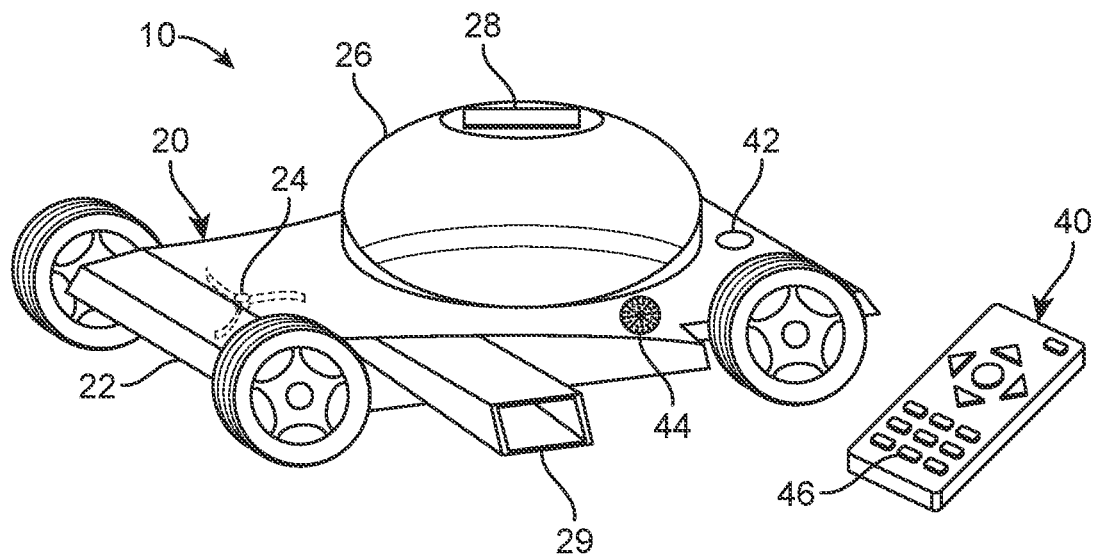

FIG. 2 shows a perspective view of solar power robotic lawnmower 10 depicting a lawnmower assembly 20 and a communication assembly 40 in accordance to an embodiment of the present invention.

Figure 3:
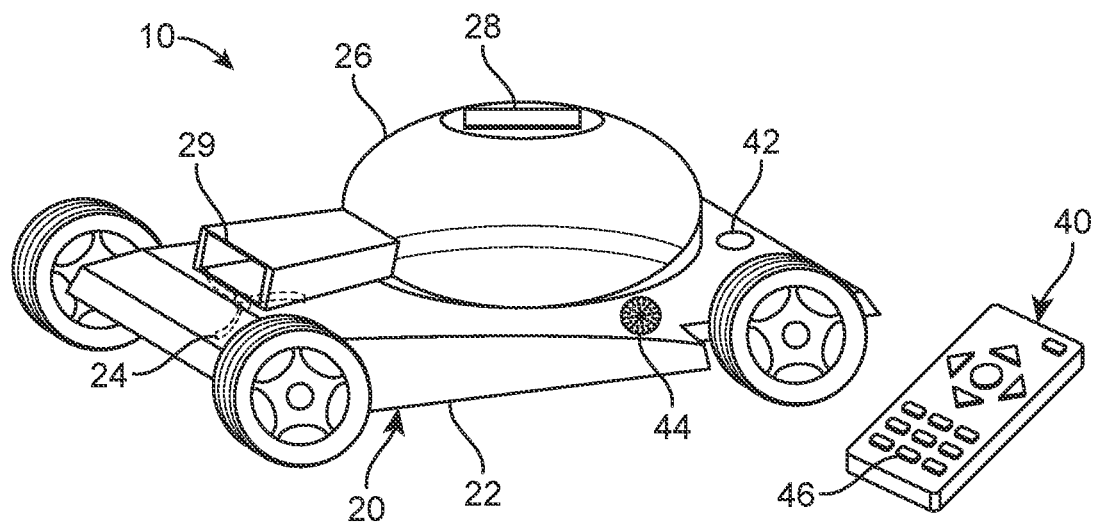

FIG. 3 illustrates a perspective view of solar power robotic lawnmower 10 depicting a lawnmower assembly 20 and a communication assembly 40 in accordance to another embodiment of the present invention.

V. DETAILED DESCRIPTION OF THE EMBODIMENTS OF THE INVENTION

Referring now to the drawings, where the present invention is generally referred to with numeral 10, it can be observed a system for a solar powered robotic lawnmower 10 which basically includes a lawnmower assembly 20 and a communication assembly 40.

Lawnmower assembly 20 includes a body 22 having a front end and a back end. In the present embodiment, body 22 includes two sets of wheels mounted to the font end and the back end of body 22. The wheels may be provided as wheels designed to traverse harsh terrain such as grass and rocks. Body 22 further includes a rotatable blade 24 mounted on a bottom end of the body. Rotatable blade 24 may be provided as plastic blades as commonly found in weed whackers that are used to clear weeds and other grass. In another embodiment, rotatable blade 24 may be provided as metal heavy duty blades that have sharp edges that will cleanly cut grass and weeds. In one implementation, rotatable blade 24 includes a rotatable pivot having a plurality of blade members attached thereon. The present embodiment includes the blades located entirely within body 22. This eliminates any potential accidents that may result in having the blades in the outer are of the body.

Lawnmower assembly 20 further includes a glass dome 26 located on a top end if body 22. Glass dome 26 is an accumulator that accumulates the grass that is being cut by rotatable blade 24. In one embodiment, glass dome 26 is provided as a removable dome having a transparent configuration. As a result, a user may observe the grass and weeds as they accumulate within glass dome 26. The removable function of glass dome 26 allows a user to collect the weeds and grass that was cut from the blades. A user may then utilize the collected waste to then be used as mulch to provide nourishment to other areas of their lawn or garden.

In one implementation, glass dome 26 is provided has having a spherical shape. However other shapes may be appreciated in alternate embodiments of the present invention. A top end of glass dome 26 includes solar panels 28 configured to provide electrical power to the lawn mower assembly 20 and communication assembly 40. Other embodiments of the present invention may feature a gas-powered motor within body 22 to provide power to the device. The solar panels 28 may be selected from a group consisting of monocrystalline, polycrystalline, or thin film solar panels. Solar panels 28 allows lawnmower assembly 20 to continuously operate in an outdoor environment.

Lawnmower assembly 20 further includes a seed chute dispenser 29 extending outwardly from body 22. In one embodiment, seed chute dispenser 29 has a rectangular shape and extends outwardly from a perimeter sidewall of body 22. This configuration can be observed in FIG. 2 of the provided drawings. In another embodiment, seed chute dispenser 29 extends outwardly from a front end of body 22 and is located in front of glass dome 26. This configuration may be observed in FIG. 3 of the provided drawings. In the present embodiment, seed chute dispenser stores seeds to be dispensed onto a user's lawn. The seeds stored therein may be from different types of grass that is usually dispersed on lawns. This may include seeds such as but not limited to, Bahia, Bermuda, Buffalo, Centipede, Creeping Bent Grass, Fescue, Kentucky Blue Grass, Perennial, and other types of grass.

Communication assembly 40 includes a communication module 42 located on a back end of body 22. In one embodiment, communication module 42 is wireless communication hardware that allows a user to wirelessly communicate with lawnmower assembly 20. This may include utilizing wireless communication protocols such as Bluetooth, 4G, 5G, LTE, and WIFI communications. In the present embodiment, communication module 42 wirelessly communicates with a remote control 46 and a mobile device 48 as observed in FIG. 1 of the drawings. As observed in the drawings, remote control 46 is a rectangular structure with a plurality of buttons. The remote control 46 controls directions and speed of the lawnmower assembly 20. Additionally, remote control 46 may also control the speed of rotatable blades 24. Furthermore, remote control 46 controls a speaker 44 mounted to body 22. Remote control 46 may control volume and playback settings of the speaker. Mobile device 48 may be provided as a phone and allows gives a user controls that are synonymous with the controls provided for remote control 46.

Speaker 44 is provided as a Bluetooth speaker located along a sidewall of body 22. In the present embodiment, speaker 44 functions as a sound suppressing means for drowning out the sound that is resulted from the lawnmower traveling through the lawn and cutting grass. Speaker 44 is configured to play audio media selected by a user in order to drown the noise from the lawnmower. In one embodiment, the audio media to be played is selected from mobile device 48.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a solar powered robotic lawnmower, comprising:
   a) a lawnmower assembly including a body having wheels, said body including a blade configured to cut grass, wherein said blade is located on a front inner portion of said body, a dome accumulator mounted to a top end of said body, solar panels mounted to a top end of said dome accumulator, wherein said dome accumulator has an hemispherical shape and slants diagonally in such a way that said rear-left portion of said dome accumulator is elevated with respect to a front-right portion thereof, wherein said dome accumulator is transparent, said dome accumulator is made of glass, a seed chute dispenser extending outwardly from a perimeter sidewall of said body, said seed chute dispenser dispensing grass seeds into a lawn area, wherein said seed chute has a rectangular prism shape; and
   b) a communication assembly including a speaker mounted to said body and a remote control, wherein said speaker is a wireless speaker in wireless communication with a mobile device, wherein said wireless speaker is a sound suppressor for noise created from said lawn mower assembly, wherein said remote control controls a motion of said body, a direction and a speed of said blade and actuation of said wireless speaker.

2. The system for a solar powered robotic lawnmower of claim 1 wherein said blade is a rotatable blade having a pivot point and a plurality of metal or plastic blades.

3. The system for a solar powered robotic lawnmower of claim 1 wherein said solar panels are selected from a group consisting essentially of monocrystalline, polycrystalline, or thin film solar panels.

4. The system for a solar powered robotic lawnmower of claim 1 wherein said seed chute dispenser protrudes outwardly from a sidewall of said body.

5. The system for a solar powered robotic lawnmower of claim 1 wherein said seed chute dispenser protrudes outwardly from a front end of said body located in front of said glass dome.

6. The system for a solar powered robotic lawnmower of claim 1 wherein said communication assembly further includes a communication module mounted to said body.

7. A system for a solar powered robotic lawnmower, consisting of:
   a) a lawnmower assembly including a body having a front end and a back end, wherein said front end and said back end each includes a set of wheels, a rotatable blade mounted beneath said front end of said body, wherein said rotatable blade includes a pivot point having a plurality of plastic blades attached thereon, a glass dome mounted to a rear portion of a top end of said body, wherein said dome includes a spherical shape and is fully transparent, wherein said dome slants diagonally in such a way that a rear-left portion of said dome accumulator is elevated with respect to a front-right portion thereof, wherein said glass dome is an accumulator which accumulates grass cut from said rotatable blade, wherein said glass dome is a removable glass dome, said glass dome further including solar panels mounted to a top end, wherein said solar panels are thin film solar panels, a seed chute dispenser having a rectangular prism shape, wherein said seed chute dispenser extends outwardly from a perimeter sidewall of said body, wherein said seed chute dispenser dispenses seeds selected from a group consisting essentially of Bahia, Fescue, Perennial; and b) a communication assembly including a communication module mounted to said back end of said body, wherein said communication module is a communication hardware allowing a user to connect with a remote control or a mobile device, wherein said remote control operates a motion of said body, actuation of said wireless speaker, and a speed and a rotating direction of said rotatable blade, said communication assembly further including a speaker mounted to a sidewall of said body, wherein said speaker is a wireless speaker in wireless communication with said mobile device, wherein said wireless speaker is a noise suppressor configured to drown out said noise provided by said lawnmower assembly.

* * * * *